(12) United States Patent
Motohashi et al.

(10) Patent No.: US 10,120,349 B2
(45) Date of Patent: Nov. 6, 2018

(54) CONTROL DEVICE AND CONTROL METHOD

(71) Applicant: AZBIL CORPORATION, Chiyoda-ku (JP)

(72) Inventors: Hayato Motohashi, Chiyoda-ku (JP); Atsushi Takahashi, Chiyoda-ku (JP); Hirofumi Hirayama, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 268 days.

(21) Appl. No.: 15/071,442

(22) Filed: Mar. 16, 2016

(65) Prior Publication Data

US 2016/0274567 A1 Sep. 22, 2016

(30) Foreign Application Priority Data

Mar. 17, 2015 (JP) .................. 2015-053075

(51) Int. Cl.
*G05B 19/402* (2006.01)
*G05B 13/04* (2006.01)
*G05B 11/42* (2006.01)

(52) U.S. Cl.
CPC ............ *G05B 13/045* (2013.01); *G05B 11/42* (2013.01); *G05B 2219/32065* (2013.01)

(58) Field of Classification Search
CPC .................. G05B 13/045; G05B 11/42; G05B 2219/32065
See application file for complete search history.

(56) References Cited

U.S. PATENT DOCUMENTS 5,909,370 A * 6/1999 Lynch ...................... G05B 5/01
  700/28
6,114,670 A * 9/2000 Erickson .............. G05B 13/021
  219/490

(Continued)

FOREIGN PATENT DOCUMENTS

JP H05-265514 A 10/1993
JP H07-200083 A 8/1995

(Continued)

OTHER PUBLICATIONS

Office Action dated Feb. 23, 2018, in Japanese Patent Application No. 2015-053075 (with English-language translation), 86 pages.

*Primary Examiner* — Mark A Connolly
(74) *Attorney, Agent, or Firm* — Oblon, McClelland, Maier & Neustadt, L.L.P.

(57) ABSTRACT

A control device includes a timing detection unit, a setpoint path generation unit, and a control computation unit. The timing detection unit detects a timing at which an event indicating a change in a target setpoint or an event indicating application of a disturbance occurs, as a generation start timing at which generation of a path of a generation setpoint is started. The setpoint path generation unit determines the path of the generation setpoint in response to determination of the generation start timing at which generation of the path of the generation setpoint is started and outputs, in every control cycle, the generation setpoint that follows the determined path. In every control cycle, the control computation unit calculates a manipulated variable by performing control computation using a process variable and the generation setpoint as input values.

10 Claims, 7 Drawing Sheets

(56) References Cited

U.S. PATENT DOCUMENTS

| | | | |
|---|---|---|---|
| 2005/0177253 A1 | 8/2005 | Tanaka et al. | |
| 2006/0136075 A1* | 6/2006 | Sun | G05B 11/42 |
| | | | 700/42 |
| 2015/0309482 A1* | 10/2015 | Iwami | G05D 23/1919 |
| | | | 700/37 |

FOREIGN PATENT DOCUMENTS

| | | |
|---|---|---|
| JP | 2008-273634 A | 11/2008 |
| JP | 4-310804 | 5/2009 |

\* cited by examiner

PATH GENERATION
START TIMING

FIG. 3B

↑
PATH GENERATION
START TIMING

CONTROL DEVICE AND CONTROL METHOD

CROSS-REFERENCE TO RELATED APPLICATION

The present application claims priority to Japanese Application No. 2015-053075 filed on Mar. 17, 2015, the entire contents of which are incorporated herein by reference.

BACKGROUND OF THE INVENTION

1. Field of the Invention

The present invention relates to control devices and control methods used in various fields, such as temperature control. More particularly, the present invention relates to a technique of generating a setpoint path and suppressing overshoot due to control in response to application of a disturbance or a change in a setpoint.

2. Description of the Related Art

Techniques of the related art for suppressing overshoot due to control in response to application of a disturbance or a change in a setpoint include a technique disclosed in Japanese Patent No. 4310804. According to the technique disclosed in Japanese Patent No. 4310804, a generation setpoint path SLSP is given to a proportional-integral-differential (PID) control computation unit so that a process variable PV settles on a user-specified target setpoint SP in accordance with a characteristic curve that represents a characteristic of the process variable PV on the phase plane. Specifically, the generation setpoint path SLSP is calculated as SLSP=SP+$\Delta$PV/k using a rate $\Delta$PV of change of a deviation (SP−PV) or of the process variable PV, and a gradient k of the characteristic curve.

Another technique for suppressing overshoot involves a setpoint ramping function included in ordinary controllers. The setpoint ramping function is a function of generating a linear (ramping) setpoint path by allowing a user to specify a period taken by a generation setpoint path given to the PID control computation unit to reach the target setpoint when the user changes the target setpoint. Since the generation setpoint input to the PID control computation unit ramps and the change in the generation setpoint becomes gradual, the setpoint ramping function is effective for suppressing overshoot when the target setpoint is changed.

In the technique disclosed in Japanese Patent No. 4310804, the setpoint path is generated using the rate of change of the deviation or of the process variable in every control computation cycle. Since the technique uses the process variable containing uncertainties (such as dynamic characteristics of the control target, measurement noise, and environmental factors) to generate the setpoint path, it is practically impossible to specify in advance a period for the generation setpoint to reach the target setpoint.

Accordingly, if the technique disclosed in Japanese Patent No. 4310804 is applied to a control target for which the target setpoint is repeatedly changed or a disturbance is repeatedly applied at a predetermined interval, the next target setpoint change or the next disturbance application may occur before the generation setpoint reaches the target setpoint. Examples of the circumstance where the target setpoint is repeatedly changed include a circumstance where the target setpoint (temperature setpoint) is repeatedly changed in a chemical manufacturing apparatus. Examples of the circumstance where a disturbance is repeatedly applied include a circumstance where temperature alters because printed circuit boards subjected to soldering are periodically put into a reflow oven having a constant target setpoint (temperature setpoint).

Figure 7A:
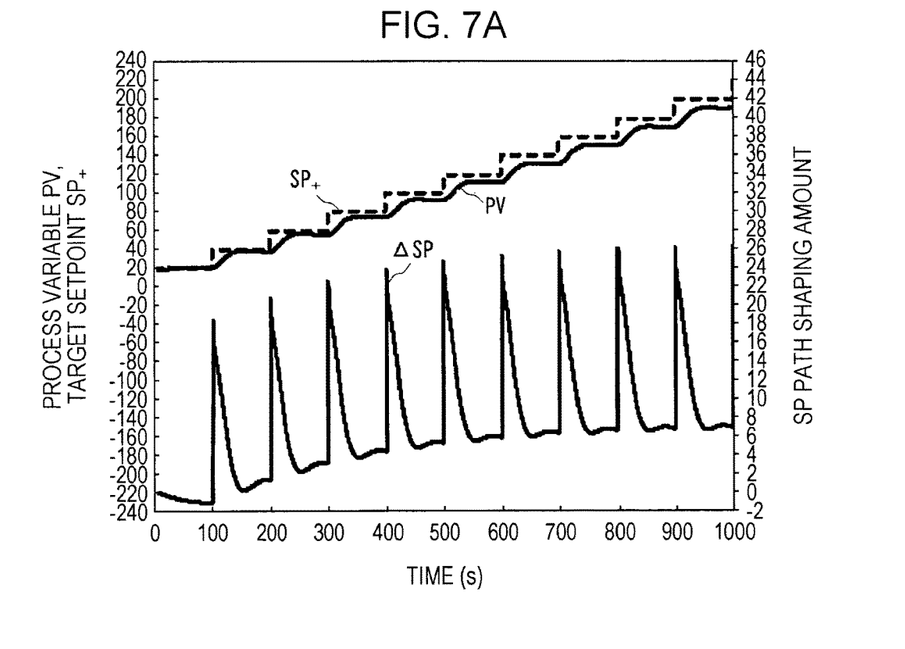
FIGS. 7A and 7B are diagrams for describing issues in the related art.
Figure 7B:
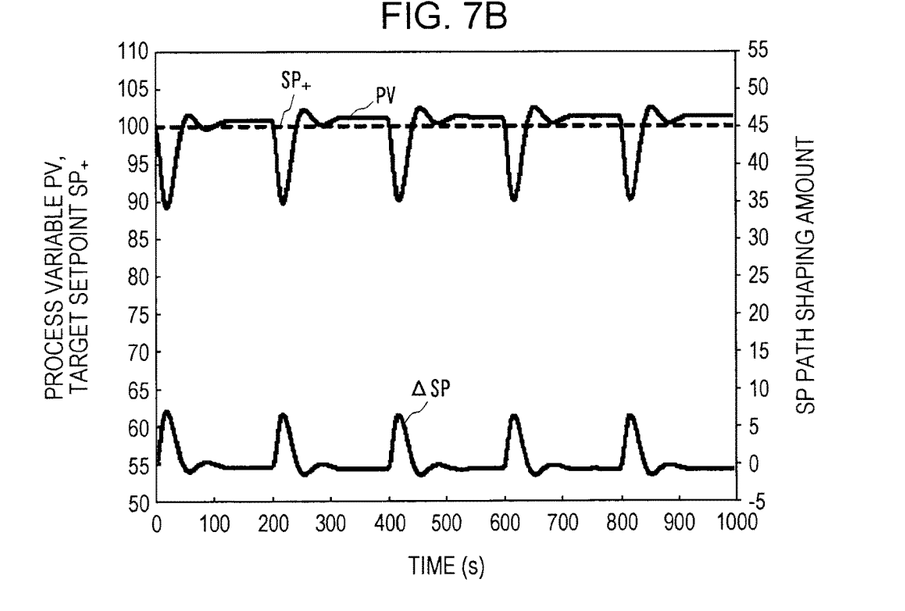

FIGS. 7A and 7B are diagrams for describing technical issues of the technique disclosed in Japanese Patent No. 4310804. FIG. 7A is a diagram illustrating an example of a control response when the target setpoint is changed, whereas FIG. 7B is a diagram illustrating an example of a control response when a disturbance is applied. In FIGS. 7A and 7B, $SP_+$ denotes a target setpoint specified by a user, PV denotes a process variable, and $\Delta SP$ denotes a shaping amount of the generation setpoint relative to the target setpoint $SP_+$ (difference between the target setpoint $SP_+$ and the generation setpoint).

A simulation result illustrated in FIG. 7A indicates that, with the technique of the related art disclosed in Japanese Patent No. 4310804, a desirable control response for which overshoot of the process variable PV is suppressed is obtained for the first change in the target setpoint $SP_+$ but the reproducibility decreases as the change in the target setpoint $SP_+$ is repeated. In addition, a simulation result illustrated in FIG. 7B indicates that a control response for which overshoot is suppressed is obtained for the first application of a disturbance but the reproducibility decreases as application of a disturbance is repeated.

Although not explicitly described in Japanese Patent No. 4310804, examples of a conceivable process used to address the issues described above include (I) a process of continuously deriving a generation setpoint path (hereinafter, referred to as a following generation setpoint path) from the final value for a generation setpoint (hereinafter, referred to as a preceding generation setpoint) along a generation setpoint path immediately preceding the following generation setpoint path, and (II) a process of performing some kind of initialization when the following generation setpoint path is started to make the preceding generation setpoint less likely to affect the following generation setpoint path.

In the case of (I), the preceding generation setpoint affects the following generation setpoint path, and the reproducibility of a control response against every change in the target setpoint and every application of a disturbance greatly decreases.

In the case of (II), since initialization of the generation setpoint causes discontinuity in the deviation, a discontinuous action also occurs during control using this deviation and disturbs the control response. Since how the control response is disturbed changes depending on the final value of the preceding generation setpoint, the value of the generation setpoint path after a specified period has passed is not guaranteed. Consequently, the reproducibility of control is not realized every time.

In addition, when a setpoint given to the PID control computation unit is generated using the setpoint ramping function included in ordinary controllers, the change in the generation setpoint takes a discontinuous behavior in which the change abruptly becomes zero upon the end of ramping. If this configuration is applied to controllers having derivative compensation, such a discontinuous behavior disturbs a control response and causes a control output to decrease upon the end of ramping, and consequently settling of the process variable takes longer. In addition, since the setpoint ramping function is for changing the target setpoint, it fails to suppress overshoot when a disturbance is applied.

SUMMARY OF THE INVENTION

Aspects of the prevent invention have been made to address the issues described above and aim to provide a control device and a control method capable of suppressing overshoot of a process variable and of realizing the reproducibility of a control response even if the control device and the control method are applied to a control target for which a target setpoint is repeatedly changed or a disturbance is repeatedly applied.

A control device according to an aspect of the present invention includes a timing detection unit, a setpoint path generation unit, and a control computation unit. The timing detection unit detects a timing at which an event indicating a change in a target setpoint or an event indicating application of a disturbance occurs, as a generation start timing at which generation of a path of a generation setpoint is started. The setpoint path generation unit determines the path of the generation setpoint in response to determination of the generation start timing at which generation of the path of the generation setpoint is started and outputs, in every control cycle, the generation setpoint that follows the determined path. The control computation unit, in every control cycle, calculates a manipulated variable by performing control computation using a process variable and the generation setpoint as input values and outputs the manipulated variable to a control target. The setpoint path generation unit determines the path of the generation setpoint to make the generation setpoint reach the target setpoint in a setpoint reaching period specified in advance, the generation setpoint change in accordance with a curved path, and an amount of change in the generation setpoint gradually become zero.

In addition, in one configuration example of the control device according to the aspect of the present invention, the setpoint path generation unit may determine the path of the generation setpoint that is an elliptic arc path.

In addition, in one configuration example of the control device according to the aspect of the present invention, the setpoint path generation unit may set an initial value for the generation setpoint to a value specified in advance.

In addition, in one configuration example of the control device according to the aspect of the present invention, the setpoint path generation unit may determine an initial value for the generation setpoint on the basis of the target setpoint, a coefficient specified in advance, and a deviation between the target setpoint and the process variable at the generation start timing or an amount of change in the target setpoint before and after the generation start timing.

In addition, in one configuration example of the control device according to the aspect of the present invention, the setpoint path generation unit may set an initial value for the generation setpoint to a sum of the target setpoint and a value specified in advance or a difference between the target setpoint and the value specified in advance.

In addition, a control method according to another aspect of the present invention includes a timing detection step of detecting a timing at which an event indicating a change in a target setpoint or an event indicating application of a disturbance occurs, as a generation start timing at which generation of a path of a generation setpoint is started; a generation setpoint path determining step of determining the path of the generation setpoint in response to determination of the generation start timing at which generation of the path of the generation setpoint is started; a generation setpoint output step of outputting, in every control cycle, the generation setpoint that follows the path determined in the generation setpoint path determining step; and a control computation step of, in every control cycle, calculating a manipulated variable by performing control computation using a process variable and the generation setpoint as input values and of outputting the manipulated variable to a control target, wherein, in the generation setpoint path determining step, the path of the generation setpoint is determined to make the generation setpoint reach the target setpoint in a setpoint reaching period specified in advance, the generation setpoint change in accordance with a curved path, and an amount of change in the generation setpoint gradually become zero.

According to the aspects of the present invention, overshoot of a process variable can be suppressed by determining a path of a generation setpoint to make the generation setpoint reach a target setpoint in a setpoint reaching period specified in advance, the generation setpoint change in accordance with a curved path, and an amount of change in the generation setpoint gradually become zero, and the reproducibility of a control response can be realized even if the aspects of the present invention are applied to a control target for which the target setpoint is repeatedly changed or a disturbance is repeatedly applied. In addition, since the aspects of the present invention successfully make a decrease in the process variable due to application of a disturbance smaller than the related art, the influence of the disturbance can be reduced and the control responsivity can be improved.

DESCRIPTION OF THE PREFERRED EMBODIMENTS

Principle of Embodiments of Invention

In embodiments of the present invention, overshoot due to control in response to application of a disturbance or a change in a target setpoint is suppressed by generating a setpoint path having characteristics as follows:

(A) A generation setpoint reaches the target setpoint in a setpoint reaching period specified in advance; and (B) The generation setpoint changes in accordance with a curved path, and an amount of change in the generation setpoint gradually becomes zero with time.

With the characteristic (A), it is guaranteed that the generation setpoint reaches the target setpoint in the setpoint reaching period by setting the setpoint reaching period to a value smaller than or equal to a time interval defined by a operating condition of a control target even if the embodiments of the present invention are applied to the control target for which the target setpoint is repeatedly changed or a disturbance is repeatedly applied at the time interval defined by the operating condition of the control target. Accordingly, an issue in the related art disclosed in Japanese Patent No. 4310804 can be addressed.

In addition, with the characteristic (B), since the generation setpoint takes a continuous behavior even when the generation setpoint reaches the target setpoint, a smooth and less-disturbed control response can be realized even if the embodiments of the present invention are applied to controllers having derivative compensation. Accordingly, an issue of the setpoint ramping function included in ordinary controllers can be addressed.

Examples of a path that satisfies the characteristics (A) and (B) include an elliptic arc path. When the generation setpoint path is implemented as an elliptic arc path, the path can be generated by setting two parameters, i.e., the setpoint reaching period and intensity. Among these parameters, the value of the setpoint reaching period is set to a value smaller than or equal to a time interval that is defined by an operating condition of the control target. In this way, it is guaranteed that the generation setpoint reaches the target setpoint at the specified timing even if the embodiments of the present invention are applied to a control target for which the target setpoint is repeatedly changed or a disturbance is repeatedly applied. Thus, the generation setpoint based on the preceding target setpoint change or the preceding disturbance application no longer affects the following generation setpoint path, and the reproducibility of a control response is maintained every time the target setpoint is changed and every time a disturbance is applied.

The intensity is a parameter for determining the initial value for the generation setpoint. As the initial value for the generation setpoint is closer to the value of the process variable, the control response becomes slower; however, an amount of overshoot can be suppressed. Conversely, as the initial value for the generation setpoint is closer to the value of the target setpoint, an amount of overshoot increases; however, the control response can be made faster.

First Embodiment

Figure 1:
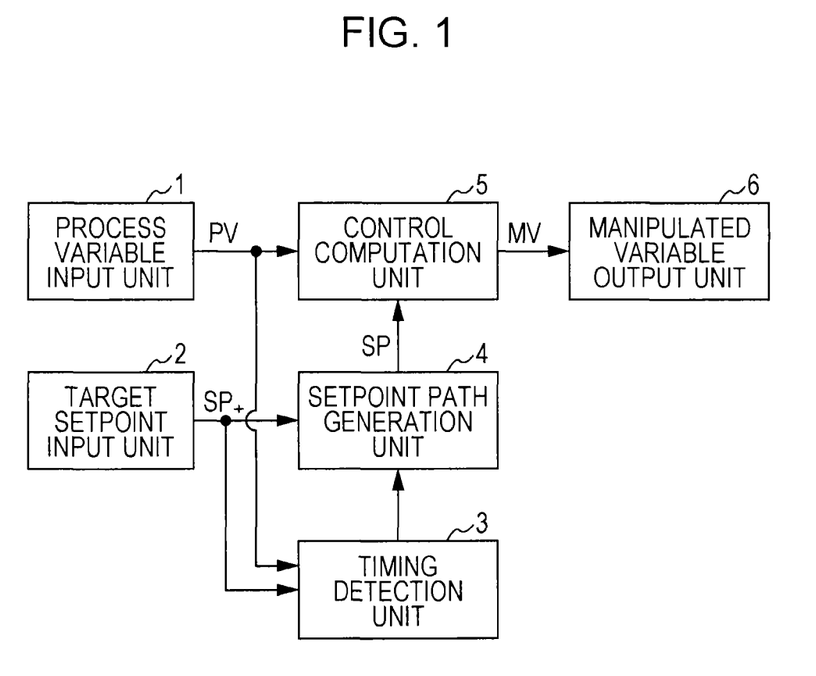
FIG. 1 is a block diagram illustrating a configuration of a control device according to a first embodiment of the present invention.

A first embodiment of the present invention will be described below with reference to the accompanying drawings. FIG. 1 is a block diagram illustrating a configuration of a control device according to the first embodiment of the present invention. The control device includes a process variable input unit 1, a target setpoint input unit 2, a timing detection unit 3, a setpoint path generation unit 4, a control computation unit 5, and a manipulated variable output unit 6. The process variable input unit 1 inputs a process variable PV measured with a measuring instrument. The target setpoint input unit 2 inputs a target setpoint $SP_+$ specified by a user of the control device. The timing detection unit 3 detects a timing at which an event indicating a change in the target setpoint $SP_+$ or an event indicating application of a disturbance occurs, as a generation start timing at which generation of a path of a generation setpoint SP is started. The setpoint path generation unit 4 determines the path of the generation setpoint SP in response to determination of the generation start timing for generating the path of the generation setpoint SP and outputs, in every control cycle, the generation setpoint SP that follows the determined path. The control computation unit 5 calculates, in every control cycle, a manipulated variable MV by performing control computation using the process variable PV and the generation setpoint SP as input values. The manipulated variable output unit 6 outputs the manipulated variable MV to the control target.

Figure 2:
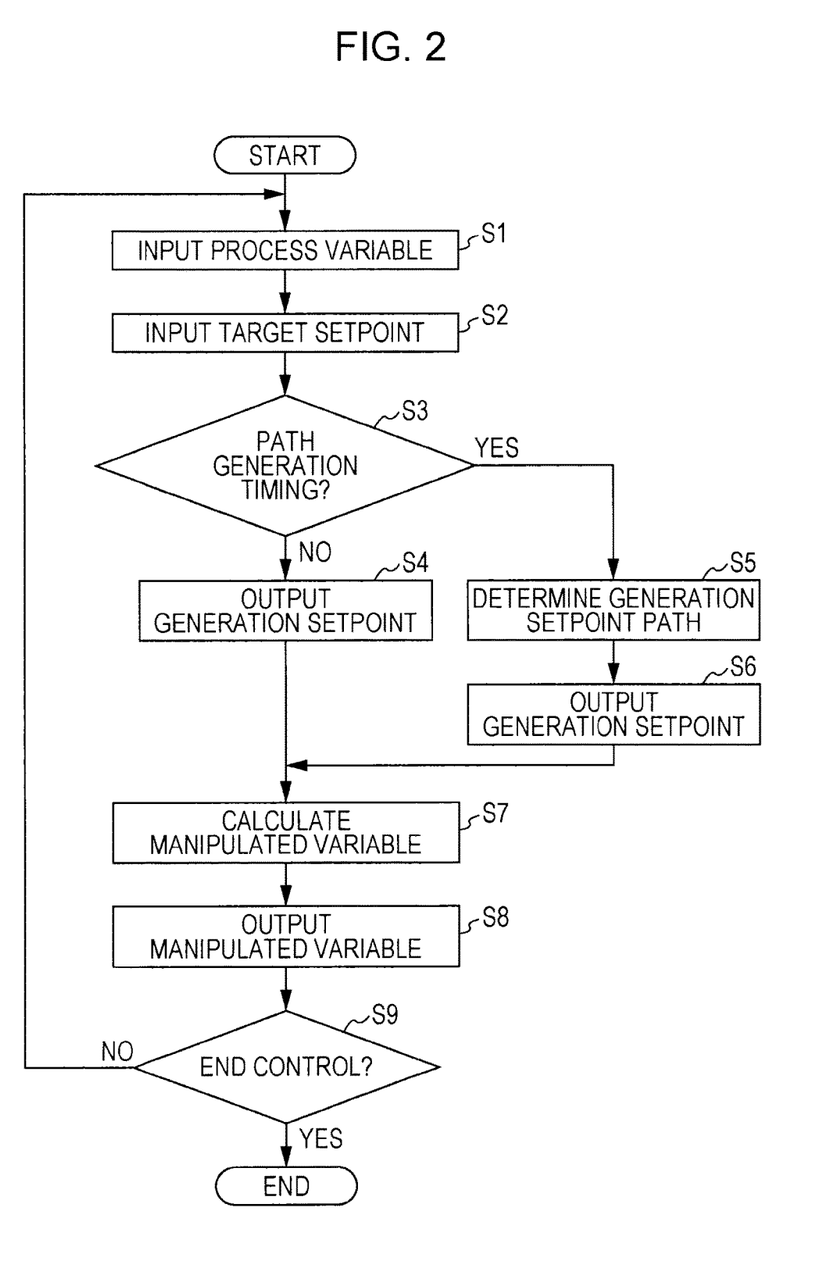
FIG. 2 is a flowchart illustrating an operation of the control device according to the first embodiment of the present invention.

An operation of the control device according to the first embodiment will be described below with reference to FIG. 2. FIG. 2 is a flowchart illustrating the operation of the control device.

The process variable PV is given from a device, such as a measuring instrument or a sensor (e.g., a temperature sensor) and is input to the control computation unit 5 and the timing detection unit 3 via the process variable input unit 1 (step S1 in FIG. 2). If the control variable PV is not used to detect the generation start timing (described later), the process variable PV need not be input to the timing detection unit 3.

The target setpoint $SP_+$ is set by a user and is input to the setpoint path generation unit 4 and the timing detection unit 3 via the target setpoint input unit 2 (step S2 in FIG. 2). If the target setpoint $SP_+$ is not used to detect the generation start timing (described later), the target setpoint $SP_+$ need not be input to the timing detection unit 3.

The timing detection unit 3 determines whether the present time point is the generation start timing for generating the path of the generation setpoint SP (step S3 in FIG. 2). Examples of the generation start timing for generating the path of the generation setpoint SP include trigger timings such as events and alarms detected by general industrial measuring instruments. Examples of the generation start timing include (a) a timing at which the process variable PV becomes larger than or equal to a certain process variable upper limit, (b) a timing at which the target setpoint $SP_+$ becomes larger than or equal to a certain setpoint upper limit, (c) a timing at which a deviation $(SP_+ - PV)$ becomes larger than or equal to a certain deviation upper limit, (d) a timing at which the process variable PV becomes smaller than or equal to a certain process variable lower limit, (e) a timing at which the target setpoint $SP_+$ becomes smaller than or equal to a certain setpoint lower limit, (f) a timing at which the deviation $(SP_+ - PV)$ becomes smaller than or equal to a certain deviation lower limit, (g) a timing at which a timing indication signal is received from an external device, and (h) a timing at which a specified period T has passed since the change in the target setpoint $SP_+$.

The timing detection unit 3 determines that the target setpoint is changed or a disturbance is applied when at least one of the events (a) to (h) occurs and determines that the timing of the event is the generation start timing for generating the path of the generation setpoint SP. Which of the events (a) to (h) is or are to be used is decided upon depending on a target to which the control device according to the first embodiment is applied.

If it is determined that the present time point is not the generation start timing for generating the path of the generation setpoint SP (NO in step S3), the setpoint path generation unit 4 outputs the generation setpoint SP that follows the already determined path to the control computation unit 5 (step S4 in FIG. 2).

If it is determined that the present time point is the generation start timing for generating the path of the generation setpoint SP (YES in step S3), the setpoint path generation unit 4 determines the path of the generation setpoint SP (step S5 in FIG. 2).

It is assumed in the first embodiment that the path of the generation setpoint SP is implemented as an elliptic arc path and that the initial value for the generation setpoint SP is directly set by the intensity described above.

Figure 3A:
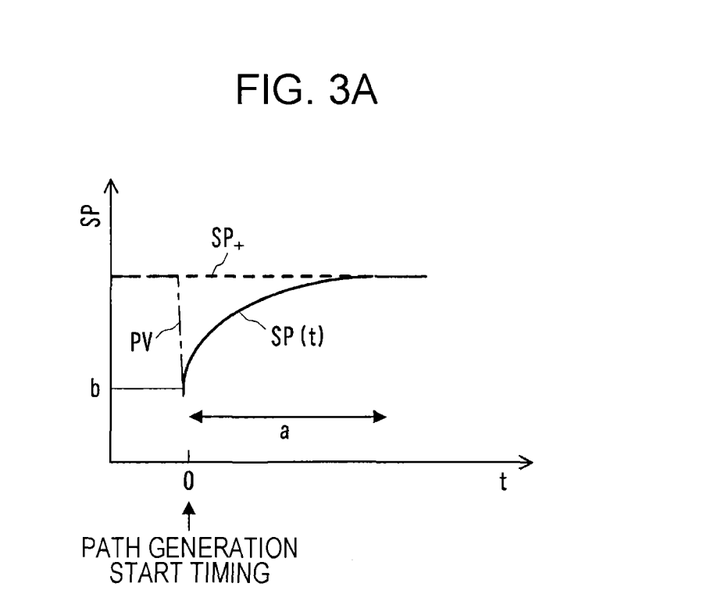
FIGS. 3A and 3B are diagrams for describing a process of determining a setpoint path in the first embodiment of the present invention.
Figure 3B:
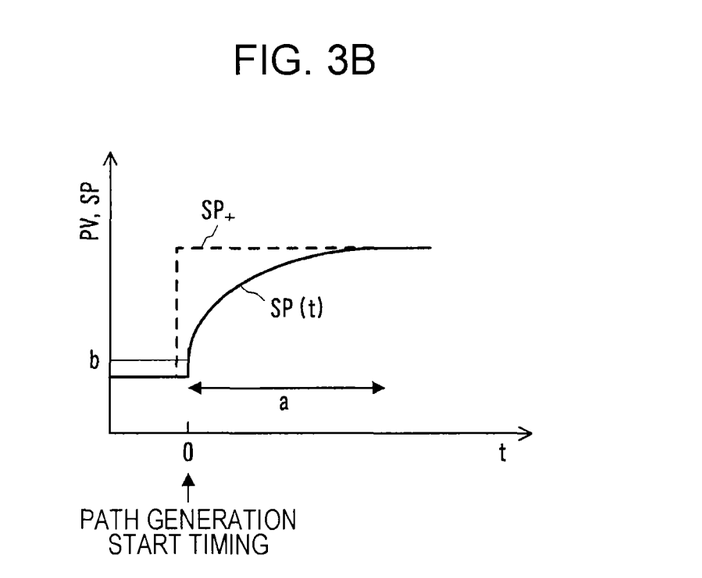

As illustrated in FIGS. 3A and 3B, the generation setpoint SP(t) at a time t is expressed by Equation (1) representing an elliptic arc path as follows:

$$SP(t) = b + \left\{ (SP_+ - b) \times \frac{\sqrt{t(2a-t)}}{a} \right\}, \quad (1)$$

where "a" denotes a setpoint reaching period taken for the generation setpoint SP to reach the target setpoint $SP_+$ from the generation start timing for generating the path of the generation setpoint SP, "b" denotes the intensity, which is a value for setting the initial value for the generation setpoint SP, and "t (0≤t≤a)" denotes an elapsed time from the generation start timing for generating the path of the generation setpoint SP. FIG. 3A illustrates the case where a disturbance is applied, and FIG. 3B illustrates the case where the target setpoint $SP_+$ is changed.

In the first embodiment, since an initial value SP(0) for the generation setpoint SP is directly set by the intensity b, SP(0) is equal to b (SP(0)=b). As the setpoint reaching period a or the intensity b increases, the overshoot suppressing effect increases; however, the control responsivity decreases. Conversely, as the setpoint reaching period a or the intensity b decreases, the overshoot suppressing effect decreases; however, the control responsivity increases.

The value of the intensity b is set in advance separately for the case where a disturbance is applied and the case where the target setpoint $SP_+$ is changed. For example, when any of the events (a), (c), (d), and (f) occurs regardless of the fact that the target setpoint $SP_+$ is kept unchanged or when a signal indicating application of a disturbance is received from an external device (event (g)), the setpoint path generation unit 4 uses the value of the intensity b set in advance for the case of application of a disturbance. For example, in the case where the first embodiment is applied to a control device that controls temperature (process variable PV) in a reflow oven, a control device (external device) that controls transportation of printed circuit boards is capable of sending a signal indicating application of a disturbance to the control device of the first embodiment at a timing at which printed circuit boards are put into the reflow oven. The value of the intensity b can be decided upon by a simulation performed in advance or a test performed at the production site.

When a signal indicating a change in the target setpoint $SP_+$ is received from an external device (event (g)) or if the specified period T has passed since the change in the target setpoint $SP_+$ (event (h)), the setpoint path generation unit 4 uses the value of the intensity b set in advance for the resulting target setpoint $SP_+$ after the change. For example, in the case where the first embodiment is applied to a control device that controls temperature (process variable PV) in a furnace for chemical manufacturing, the value of the intensity b can be set in advance for each value for the target setpoint $SP_+$ since how the target setpoint $SP_+$ is changed is known in advance.

Note that the specified period T may be 0 or may be larger than 0 depending on the operating condition of the control target or the like. In addition, in the case where a notification is received from an external device, the notification may be delayed with respect to application of a disturbance or a change in the target setpoint $SP_+$. Accordingly, the setpoint reaching period a needs to be set by taking these periods into account in advance.

The setpoint path generation unit 4 then outputs the generation setpoint SP(t) that follows the path (Equation (1)) determined in step S5 to the control computation unit 5 (step S6 in FIG. 2). At the generation start timing for generating the path of the generation setpoint SP, the value SP(0)=b is output as described above.

The control computation unit 5 calculates the manipulated variable MV on the basis of the process variable PV input from the process variable input unit 1 and the generation setpoint SP(t) input from the setpoint path generation unit 4 to make the process variable PV match the generation setpoint SP(t) (step S7 in FIG. 2). Examples of a feedback control computation algorithm include PID control computation. Since the PID control computation is a common technique, a description thereof is omitted.

The manipulated variable output unit 6 outputs the manipulated variable MV calculated by the control computation unit 5 to the control target (step S8 in FIG. 2). The destination to which the manipulated variable MV is actually output may be, for example, an actuator that actuates a valve or the like or a relay or power conditioner (thyristor unit) that actuates a heater or the like.

The above-described process including steps S1 to S8 is performed in every control cycle until the control ends (YES in step S9 in FIG. 2) in response to an instruction from a user, for example.

In each control cycle, the generation setpoint SP(t) calculated using Equation (1) is output from the setpoint path generation unit 4 (step S4). In addition, when the elapsed time t since the generation start timing (t=0) for generating the path of the generation setpoint SP(t) reaches the setpoint reaching period a, the generation setpoint SP(t) reaches the target setpoint $SP_+$. Thereafter, the setpoint path generation unit 4 maintains the generation setpoint SP(t) at the target setpoint $SP_+$ (SP(t)=$SP_+$) without using Equation (1) until the next generation start timing for generating the path of the generation setpoint SP(t) comes.

Figure 4A:
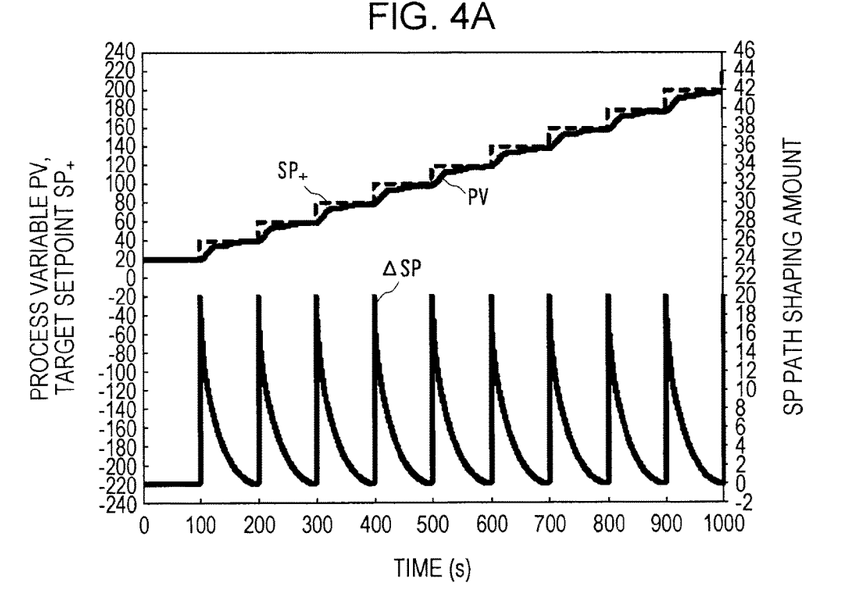
FIGS. 4A and 4B are diagrams illustrating examples of a control response in the first embodiment of the present invention.
Figure 4B:
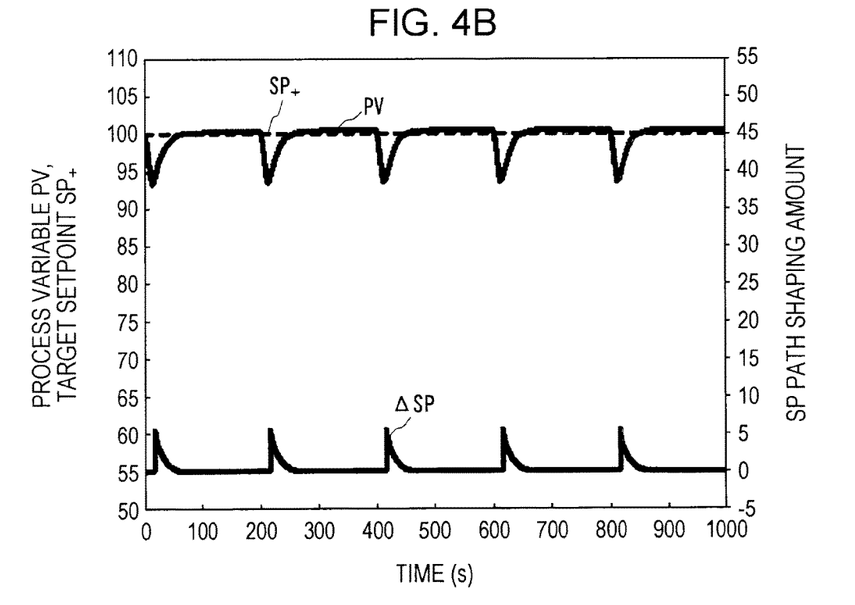

FIG. 4A is a diagram illustrating an example of a control response when the target setpoint $SP_+$ is changed in the first embodiment, whereas FIG. 4B is a diagram illustrating an example of a control response when a disturbance is applied in the first embodiment. As in FIGS. 7A and 7B, ΔSP denotes a shaping amount of the generation setpoint SP(t) relative to the target setpoint $SP_+$ (difference between the target setpoint $SP_+$ and the generation setpoint SP(t)).

A simulation result illustrated in FIG. 4A indicates that a desirable control response for which overshoot of the process variable PV is suppressed can be obtained and high reproducibility is realized in the first embodiment. Similarly, a simulation result illustrated in FIG. 4B indicates that a control response for which overshoot is suppressed can be obtained and high reproducibility is realized.

An advantage of typical PID control is that it enables intuitive adjustment even if the model of the control target is unknown. The setpoint path generation technique applied to such control is often desired to have flexibility to the applied environment and good control reproducibility, rather than strictness emphasizing coherence of the physical model. In the first embodiment, overshoot of the process variable PV can be suppressed by implementing the path of the generation setpoint SP as an elliptic arc path, and the reproducibility of a control response can be realized even if the first embodiment is applied to a control target for which the target setpoint $SP_+$ is repeatedly changed or a disturbance is repeatedly applied. In addition, as is apparent from comparison of FIG. 7B with FIG. 4B, since a decrease in the process variable PV due to application of a disturbance can be made smaller in the first embodiment than in the related art disclosed in Japanese Patent No. 4310804, the influence of the disturbance can be reduced and the control responsivity can be improved.

Second Embodiment

A second embodiment of the present invention will be described next. Since the configuration of the control device and the flow of the process in the second embodiment are similar to those of the first embodiment, a description will be given using reference signs used in FIGS. 1 and 2. Differences between the second embodiment and the first embodiment are the process of determining the path of the generation setpoint SP(t) (step S5 in FIG. 2) and the process of outputting the generation setpoint SP(t) (steps S4 and S6 in FIG. 2).

In the first embodiment, the initial value SP(0) for the generation setpoint SP(t) is directly set by the intensity b. In contrast, in the second embodiment, the initial value SP(0) for the generation setpoint SP(t) is determined using the target setpoint $SP_+$, the intensity b, and a deviation I ($=SP_+-PV$) at the generation start timing for generating the path of the generation setpoint SP(t) or an amount of change I ($=SP_+(t)-SP_+(t-1)$) in the target setpoint $SP_+$ before and after the generation start timing.

Figure 5A:
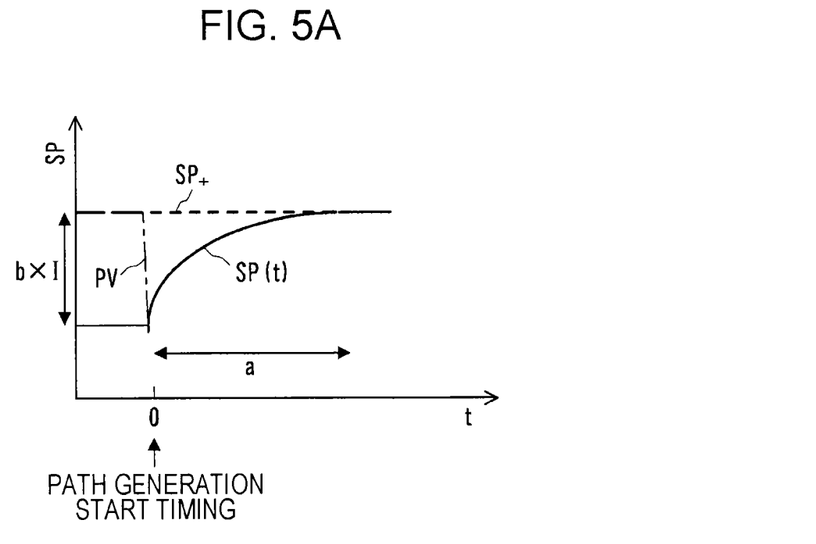
FIGS. 5A and 5B are diagrams for describing a process of determining a setpoint path in a second embodiment of the present invention.
Figure 5B:
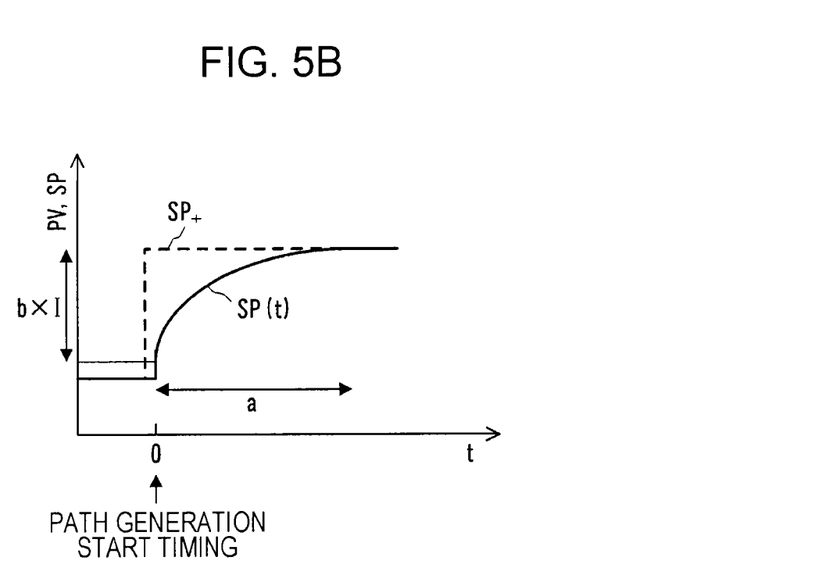

As illustrated in FIGS. 5A and 5B, the generation setpoint SP(t) at a time t is expressed by Equation (2) representing an elliptic arc path as follows:

$$SP(t) = (SP_+ - b \times I) + \left\{ b \times I \times \frac{\sqrt{t(2a-t)}}{a} \right\}, \quad (2)$$

where "a" denotes a setpoint reaching period and "t ($0 \le t \le a$)" denotes an elapsed time from the generation start timing for generating the path of the generation setpoint SP. FIG. 5A illustrates the case where a disturbance is applied, and FIG. 5B illustrates the case where the target setpoint $SP_+$ is changed.

As described above, "I" in Equation (2) denotes a deviation ($SP_+-PV$) at the generation start timing for generating the path of the generation setpoint SP(t) or the amount of change ($SP_+(t)-SP_+(t-1)$) in the target setpoint $SP_+$ before and after the generation start timing. Here, $SP_+(t)$ denotes the target setpoint $SP_+$ after the change, and $SP_+(t-1)$ denotes the target setpoint $SP_+$ before the change. In the second embodiment, the intensity b is set in advance as a coefficient (fixed value) which the deviation (or the amount of change in the target setpoint $SP_+$) I is multiplied by.

In the second embodiment, the initial value SP(0) for the generation setpoint SP is equal to $SP_+-b \times I$ ($SP(0)=SP_+-b \times I$). As in the first embodiment, as the setpoint reaching period a or the intensity b increases, the overshoot suppressing effect increases; however, the control responsivity decreases. Conversely, as the setpoint reaching period a or the intensity b decreases, the overshoot suppressing effect decreases; however, the control responsivity improves.

At the generation start timing for generating the path of the generation setpoint SP, the initial value SP(0) is output from the setpoint path generation unit 4 (step S6 in FIG. 2). In each control cycle thereafter, the generation setpoint SP(t) calculated using Equation (2) is output from the setpoint path generation unit 4 (step S4 in FIG. 2). In addition, when the elapsed time t since the generation start timing (t=0) for generating the path of the generation setpoint SP(t) reaches the setpoint reaching period a, the generation setpoint SP(t) reaches the target setpoint $SP_+$. Thereafter, the setpoint path generation unit 4 maintains the generation setpoint SP(t) at the target setpoint $SP_+$ ($SP(t)=SP_+$) without using Equation (2) until the next generation start timing for generating the path of the generation setpoint SP(t) comes.

The rest of the configuration of the second embodiment is as described in the first embodiment. In this way, advantageous effects similar to those of the first embodiment can be obtained also in the second embodiment. The intensity b need not be changed in the second embodiment although the intensity b needs to be changed every time the target setpoint $SP_+$ is changed in the first embodiment.

Third Embodiment

A third embodiment of the present invention will be described next. Since the configuration of the control device and the flow of the process in the third embodiment are similar to those of the first embodiment, a description will be given using reference signs used in FIGS. 1 and 2. Differences between the third embodiment and the first embodiment are the process of determining the path of the generation setpoint SP(t) (step S5 in FIG. 2) and the process of outputting the generation setpoint SP(t) (steps S4 and S6 in FIG. 2).

In the first embodiment, the initial value SP(0) for the generation setpoint SP(t) is directly set by the intensity b. In contrast, in the third embodiment, the initial value SP(0) for the generation setpoint SP(t) is set to the sum of the target setpoint $SP_+$ and the intensity b, which is a value specified in advance, or a difference between the target setpoint $SP_+$ and the intensity b.

Figure 6A:
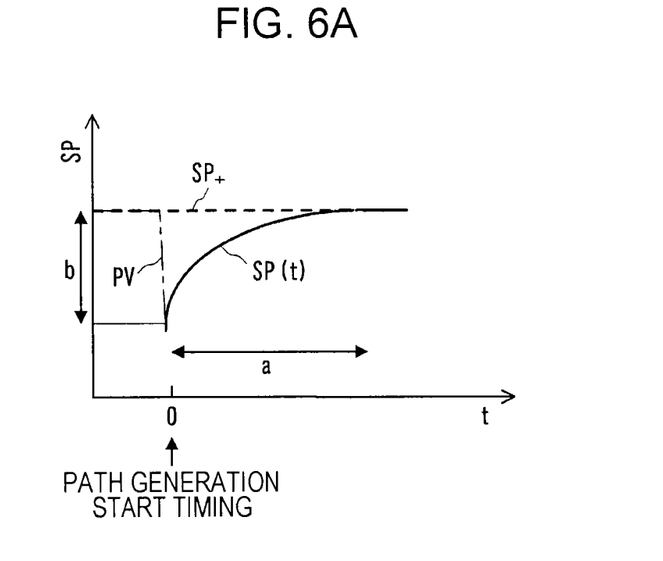
FIGS. 6A and 6B are diagrams for describing a process of determining a setpoint path in a third embodiment of the present invention.
Figure 6B:
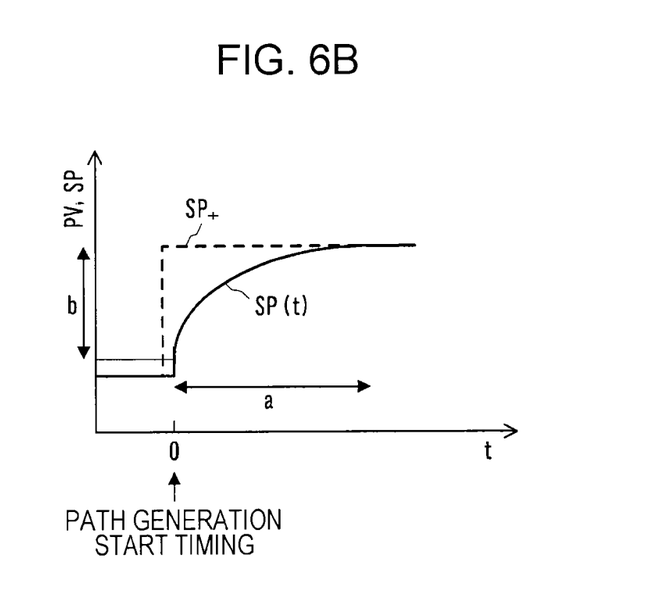

As illustrated in FIGS. 6A and 6B, the generation setpoint SP(t) at a time t is expressed by Equation (3) representing an elliptic arc path as follows:

$$SP(t) = SP_+ \pm b \times \left\{ 1 - \frac{\sqrt{t(2a-t)}}{a} \right\}, \quad (3)$$

where "a" denotes a setpoint reaching period and "t ($0 \le t \le a$)" denotes an elapsed time from the generation start timing for generating the path of the generation setpoint SP. FIG. 6A illustrates the case where a disturbance is applied, and FIG. 6B illustrates the case where the target setpoint $SP_+$ is changed.

The symbol "$\pm$" in Equation (3) indicates that the symbol "$-$" is used in a circumstance where the generation setpoint SP(t) is increased due to application of a disturbance for decreasing the process variable PV or due to an increase in the target setpoint $SP_+$ when the initial value SP(0) is smaller than or equal to the target setpoint $SP_+$, that is, in the case of $SP(0) \le SP_+$, and indicates that the symbol "+" is used in a circumstance where the generation setpoint SP(t) is decreased due to application of a disturbance for increasing the process variable PV or due to a decrease in the target setpoint $SP_+$ when the initial value SP(0) is larger than the target setpoint $SP_+$, that is, in the case of $SP(0) > SP_+$.

At the generation start timing for generating the path of the generation setpoint SP, the initial value SP(0) ($=SP_+ \pm b$) is output from the setpoint path generation unit 4 (step S6 in FIG. 2). In each control cycle thereafter, the generation setpoint SP(t) calculated using Equation (3) is output from the setpoint path generation unit 4 (step S4 in FIG. 2). In addition, when the elapsed time t since the generation start timing (t=0) for generating the path of the generation setpoint SP(t) reaches the setpoint reaching period a, the generation setpoint SP(t) reaches the target setpoint $SP_+$. Thereafter, the setpoint path generation unit 4 maintains the generation setpoint SP(t) at the target setpoint $SP_+$ (SP(t)=$SP_+$) without using Equation (3) until the next generation start timing for generating the path of the generation setpoint SP(t) comes.

The rest of the configuration of the third embodiment is as described in the first embodiment. In this way, advantageous effects similar to those of the first embodiment can be obtained in the third embodiment. The intensity b need not be changed in the third embodiment as in the second embodiment although the intensity b needs to be changed every time the target setpoint $SP_+$ is changed in the first embodiment.

The control device according to each of the first to third embodiments can be implemented by a computer including a central processing unit (CPU), a storage device, and an interface and a program for controlling these hardware resources. The CPU performs the process described in each of the first to third embodiments in accordance with the program stored in the storage device.

The embodiments of the present invention are applicable to various types of control, such as temperature control.

What is claimed is:

1. A control device, comprising:
processing circuitry configured to
detect a timing at which an event indicating a change in a target setpoint or an event indicating application of a disturbance occurs, as a generation start timing at which generation of a path of a generation setpoint is started;
determine the path of the generation setpoint in response to determination of the generation start timing at which generation of the path of the generation setpoint is started and outputs, in every control cycle, the generation setpoint that follows the determined path; and
in every control cycle, calculate a manipulated variable by performing control computation using a process variable and the generation setpoint as input values and output the manipulated variable to a control target,
wherein the processing circuitry is further configured to determine the path of the generation setpoint to make the generation setpoint reach the target setpoint in a setpoint reaching period specified in advance, the generation setpoint being changed in accordance with a curved path, and an amount of change in the generation setpoint gradually become zero.

2. The control device according to claim 1, wherein the processing circuitry is further configured to determine the path of the generation setpoint that is an elliptic arc path.

3. The control device according to claim 1, wherein the processing circuitry is further configured to set an initial value for the generation setpoint to a value specified in advance.

4. The control device according to claim 1, wherein the processing circuitry is further configured to determine an initial value for the generation setpoint based on the target setpoint, a coefficient specified in advance, and a deviation between the target setpoint and the process variable at the generation start timing or an amount of change in the target setpoint before and after the generation start timing.

5. The control device according to claim 1, wherein the processing circuitry is further configured to set an initial value for the generation setpoint to a sum of the target setpoint and a value specified in advance or a difference between the target setpoint and the value specified in advance.

6. A control method, comprising:
detecting a timing at which an event indicating a change in a target setpoint or an event indicating application of a disturbance occurs, as a generation start timing at which generation of a path of a generation setpoint is started;
determining the path of the generation setpoint in response to determination of the generation start timing at which generation of the path of the generation setpoint is started;
outputting, in every control cycle, the generation setpoint that follows the path determined in the determining step; and
in every control cycle, calculating a manipulated variable by performing control computation using a process variable and the generation setpoint as input values and of outputting the manipulated variable to a control target,
wherein, in the determining step, the path of the generation setpoint is determined to make the generation setpoint reach the target setpoint in a setpoint reaching period specified in advance, the generation setpoint being changed in accordance with a curved path, and an amount of change in the generation setpoint gradually become zero.

7. The control method according to claim 6, wherein, in the determining step, the path of the generation setpoint that is an elliptic arc path is determined.

8. The control method according to claim 6, wherein, in the determining step, an initial value for the generation setpoint is set to a value specified in advance.

9. The control method according to claim 6, wherein, in the determining step, an initial value for the generation setpoint is determined based on the target setpoint, a coefficient specified in advance, and a deviation between the target setpoint and the process variable at the generation start timing or an amount of change in the target setpoint before and after the generation start timing.

10. The control method according to claim 6, wherein, in the determining step, an initial value for the generation setpoint is set to a sum of the target setpoint and a value specified in advance or a difference between the target setpoint and the value specified in advance.

* * * * *